US007832299B2

(12) United States Patent
Kobayashi et al.

(10) Patent No.: US 7,832,299 B2
(45) Date of Patent: Nov. 16, 2010

(54) GEAR-TYPE TRANSMISSION APPARATUS

(75) Inventors: Kazutaka Kobayashi, Nishio (JP);
Shiro Ogami, Kariya (JP); Yuichi Fukuhara, Toyoake (JP)

(73) Assignee: Aisin Ai Co., Ltd., Nishio-Shi, Aichi-Ken (JP)

( * ) Notice: Subject to any disclaimer, the term of this patent is extended or adjusted under 35 U.S.C. 154(b) by 355 days.

(21) Appl. No.: 12/031,114

(22) Filed: Feb. 14, 2008

(65) Prior Publication Data
US 2008/0196543 A1 Aug. 21, 2008

(30) Foreign Application Priority Data
Feb. 16, 2007 (JP) ............... 2007-036985

(51) Int. Cl.
*F16H 3/08* (2006.01)
(52) U.S. Cl. .............. 74/330; 74/329; 74/331; 74/340
(58) Field of Classification Search .......... 74/329, 74/330, 331, 340, 360
See application file for complete search history.

(56) References Cited
U.S. PATENT DOCUMENTS

| 2,612,787 | A | 10/1952 | Youngren et al. |
| 2,644,340 | A | 7/1953 | Youngren et al. |
| 7,437,963 | B2 * | 10/2008 | Haka et al. ............... 74/329 |
| 7,448,290 | B2 * | 11/2008 | Gitt ........................... 74/331 |
| 7,669,497 | B2 * | 3/2010 | Borgerson et al. ........ 74/340 |
| 2003/0051577 | A1 | 3/2003 | Hirt |
| 2003/0121343 | A1 | 7/2003 | Berger et al. |
| 2006/0219033 | A1 * | 10/2006 | Gitt ........................... 74/330 |
| 2008/0034905 | A1 * | 2/2008 | Hatori et al. ............... 74/330 |

FOREIGN PATENT DOCUMENTS

| DE | 103 104 72 A1 | 10/2003 |
| EP | 1 837 554 A2 | 9/2007 |
| JP | 2003-522922 A | 7/2003 |
| JP | 2003-532040 A | 10/2003 |
| WO | WO 97/34090 A1 | 9/1997 |

* cited by examiner

*Primary Examiner*—David D Le
(74) *Attorney, Agent, or Firm*—Buchanan Ingersoll & Rooney PC

(57) ABSTRACT

A gear-type transmission apparatus includes a first input shaft, a second input shaft provided coaxially and rotatably relative to the first input shaft, a first counter shaft and a second counter shaft arranged in parallel to the first and the second input shafts, an output shaft, a dual clutch mechanism having a first clutch and a second clutch for transmitting a rotation of a driving shaft driven by a power source to the first and the second input shafts, a first gear change mechanism, a second gear change mechanism, a reverse gear set having a reverse shift stage driving gear, a reverse shift stage intermediate gear, and a reverse shift stage driven gear, and a switching clutch having a reverse shift stage engaging member for establishing/interrupting a torque transmission from the driving shaft to the output shaft via the reverse shift set.

12 Claims, 5 Drawing Sheets

FIG. 3

| | Dual clutch 12 | | 1st clutch 30A | | 2nd clutch 30B | | | | 4th clutch 30D | | | 3rd clutch 30C | | 5th clutch 30E | |
|---|---|---|---|---|---|---|---|---|---|---|---|---|---|---|---|
| | C1 | C2 | S1 | N | S3 | S2 | N | S4 | S5 | N | S7 | N | S6 | N | SR |
| 1st | O | | O | | | | | | | | | | | O | |
| 2nd | | O | | O | | O | | | | | | | | O | |
| 3rd | O | | | | O | | | | | O | | | | O | |
| 4th | | O | | O | | | O | O | | | | | | O | |
| 5th | O | | | O | | | | | O | | | | | O | |
| 6th | | O | | | | | O | | | | | | O | O | |
| 7th | O | | | | | | O | | | | O | O | | | |
| Reverse | | O | O | | | | O | | | O | | O | | | O |

F I G. 5

| | Dual clutch 12 | | 1st clutch 49A | | | 2nd clutch 49B | | | 3rd clutch 49C | | | 4th clutch 49D | | |
|---|---|---|---|---|---|---|---|---|---|---|---|---|---|---|
| | C1 | C2 | S1 | N | S5 | S3 | N | S7 | S2 | N | S6 | S4 | N | SR |
| 1st | ○ | | ○ | | | | | | | | | | | |
| 2nd | | ○ | | ○ | | | ○ | | | | | | ○ | |
| 3rd | ○ | | | ○ | | | ○ | | | | | | ○ | |
| 4th | | ○ | | ○ | | | | | | ○ | | | | |
| 5th | ○ | | | | ○ | | ○ | | | ○ | | | ○ | |
| 6th | | ○ | | ○ | | | ○ | | | ○ | | ○ | | |
| 7th | ○ | | | ○ | | | | | | ○ | | | ○ | |
| Reverse | | ○ | ○ | | | | ○ | | | ○ | | | | ○ |

GEAR-TYPE TRANSMISSION APPARATUS

CROSS REFERENCE TO RELATED APPLICATIONS

This application is based on and claims priority under 35 U.S.C. §119 to Japanese Patent Application 2007-036985, filed on Feb. 16, 2007, the entire content of which is incorporated herein by reference.

FIELD OF THE INVENTION

The present invention relates to a gear-type transmission apparatus that is suitable to apply to a vehicle such as an automobile. Specifically, the present invention relates to the gear-type transmission apparatus having a dual clutch.

BACKGROUND

Known gear-type transmission apparatuses having a dual clutch are disclosed, for example, in JP2003532040A and in JP2003522922A.

As illustrated in FIG. 6, in the known gear-type transmission apparatus disclosed in JP2003532040A, two parallel gear paths are formed by a transmission input shaft 503 and a transmission input shaft 504 that is formed in a hollow shape and surrounds the transmission input shaft 503, and two transmission output shafts 505 and 506 arranged in parallel to the transmission input shafts 503 and 504. The two gear paths arranged parallel to each other are connected to a driving shaft 501 of an engine via a clutch unit 502. The clutch unit 502 includes two clutch discs 502a and 502b. The clutch disc 502a is assigned to the first transmission input shaft 503 carrying gears of a 1st gear set 506, of a 3rd gear set 209 and of a 5th gear set 511. The clutch disc 502b is assigned to the second transmission input shaft 504 carrying gears of a 2nd gear set 508, of a 4th gear set 510 and of a 6th gear set 512. Further, in the known gear-type transmission apparatus disclosed in JP2003532040, a transmission driven shaft 519, at which two reverse shift stage gears 513 and 514 for backwardly driving a vehicle are provided, is additionally provided at the transmission apparatus. The transmission input shafts 503 and 504 are assigned to the reverse shift stage gears 513 and 514 of the reverse gear set respectively.

The known gear-type transmission apparatus disclosed in JP2003532040 transmits an engine torque to the transmission output shaft 506 for a forward movement of the vehicle in a manner where, firstly each of the clutch discs 502a and 502b is engaged in turn, secondly the known gear-type transmission apparatus selects any one of the 1st shift stage gear 507, the 2nd shift stage gear 508 and the 4th shift stage gear 510 by an operation of two slide sleeves 517 and 518 in order to shift a rotational direction of each of the transmission input shaft 503 and 504 to a rotational direction for forwardly moving the vehicle and then the known gear-type transmission apparatus transmits the shifted rotation to the transmission output shaft 506, thirdly the known gear-type transmission apparatus selects anyone of the 3rd shift stage gear 509, a 5th shift stage gear 511 and a 6th shift stage gear 512 by an operation of two slide sleeves 515 and 516 in order to shift the rotational direction of each of the transmission input shafts 503 and 504 to the rotational direction for forwardly moving the vehicle, and finally the known gear-type transmission apparatus transmits the shifted rotation of each of the transmission input shafts 503 and 504 to the transmission output shaft 505. On the other hand, the known gear-type transmission apparatus disclosed in JP2003532040 transmits the engine torque to the transmission output shaft 506 for a reverse movement of the vehicle by operating the reverse gear set 513 and 514 by the operation of the slide sleeve 515 and by shifting the rotational direction of the transmission input shaft 504 to a rotational direction for backwardly moving the vehicle. As a result, the known gear-type transmission transmits the shifted rotation to the transmission output shaft 506.

On the other hand, the known gear-type transmission apparatus disclosed in JP2003522922 includes an output shaft, which is arranged at substantially centre of the gear-type transmission apparatus, and a first and a second shafts, both of which are arranged parallel to the output shaft. In the known gear-type transmission apparatus disclosed in JP2003522922, two gear paths are formed in parallel by the output shaft and the first shaft and by the output shaft and the second shaft. Each of the gear paths is connected to an engine via a clutch unit including a first and a second clutches. The first clutch is assigned to one of the gear paths having four different shift stages for forward movement, and the second clutch is assigned to the other gear path having three different shift stage gear sets for the forward movement and a reverse shift stage gear set for backwardly moving the vehicle. The reverse shift stage gear set includes three gears (a first, a second and a third gears), which are engaged with each other. Further, the second gear of the reverse shift stage gear set is provided at an intermediate shaft that is provided at the known gear-type transmission apparatus disclosed in JP2003522922 in addition to the output shaft, the first and the second shafts. The known gear-type transmission apparatus disclosed in JP2003522922 achieves each shift stage by engaging/disengaging the two clutches in turn and by operating two shift stage switching clutch devices provided at each of the first and the second shafts.

In the above-mentioned known gear-type transmission apparatuses, each shaft to which gears for the forward movement is arranged parallel to each other to be rotatable around an axial line thereof. Further, in the above-mentioned known gear-type transmission apparatus, a gear change mechanism is provided between the shaft arranged along an axial line and one of the two shafts, and another gear change mechanism is provided between the shaft arranged along the axial line and the other one of the two shafts. The two gear change mechanisms are provided so as to be in parallel to each other in the axial direction of the shafts and so as to face to each other. As a result, an entire length of the known gear-type transmission apparatuses is reduced.

However, each of the above-mentioned gear-type transmission apparatuses further includes another shaft (a reverse shaft) that supports at least one of the gears for reverse movement in addition to the three shafts and that provided in parallel to the axial lines thereof. Therefore, a cross-sectional area of each of the known gear-type transmission apparatuses viewed in a direction perpendicular to the axial direction of the shafts is widened to include the reverse shaft and the gears supported thereby. Hence, minimization of the known gear-type transmission apparatuses is not sufficient.

A need thus exists to provide a gear-type transmission apparatus which is not susceptible to the drawback mentioned above.

SUMMARY OF THE INVENTION

According to an aspect of the present invention, a gear-type transmission apparatus includes a first input shaft, a second input shaft provided at the first input shaft so as to be coaxially with the first input shaft and rotatably relative to the first input shaft, a first counter shaft and a second counter shaft, both of which being arranged in parallel to the first and the second input shafts, an output shaft, a dual clutch mechanism having a first clutch and a second clutch for transmitting a rotation of a driving shaft driven by a power source to the first and the second input shafts, a first gear change mechanism provided between the first and the second input shafts and the first counter shaft, a second gear change mechanism provided between the first and the second input shafts and the second counter shaft, a reverse gear set having a reverse shift stage driving gear provide at one of the first and the second input shafts, a reverse shift stage intermediate gear provided at one of the first and the second counter shafts and engaged with the reverse shift stage driving gear, and a reverse shift stage driven gear provided at the other one of the first and the second counter shafts and engaged with the reverse shift stage intermediate gear, and a switching clutch having a reverse shift stage engaging member for establishing/interrupting a torque transmission from the driving shaft to the output shaft via the reverse shift set.

According to another aspect of the present invention, a gear-type transmission apparatus includes an output shaft, a first counter shaft and a second counter shaft, both of which are arranged in parallel to the output shaft, a dual clutch mechanism having a first clutch and a second clutch for transmitting a rotation of a driving shaft driven by a power source to the first and the second counter shafts, a first gear change mechanism provided between the first counter shaft and the output shaft, a second gear change mechanism provided between the second counter shaft and the output shaft, a reverse gear set having a reverse shift stage driving gear provided at one of the first and the second counter shafts, a reverse shift stage intermediate gear provided at the other one of the first and the second counter shafts and engaged with the reverse shift stage driving gear, and a reverse shift stage driven gear provided at the output shaft and engaged with the reverse shift stage intermediate gear, and a switching clutch having a reverse shift stage engaging member for establishing/interrupting a torque transmission from the driving shaft to the output shaft via the reverse gear set.

BRIEF DESCRIPTION OF THE DRAWINGS

The foregoing and additional features and characteristics of the present invention will become more apparent from the following detailed description considered with reference to the accompanying drawings, wherein:

FIG. 3 is a table explaining a shift operation of the gear-type transmission apparatus according to the first embodiment;

FIG. 5 is a table explaining a shift operation of the gear-type transmission apparatus according to the second embodiment.

DETAILED DESCRIPTION

Figure 1:
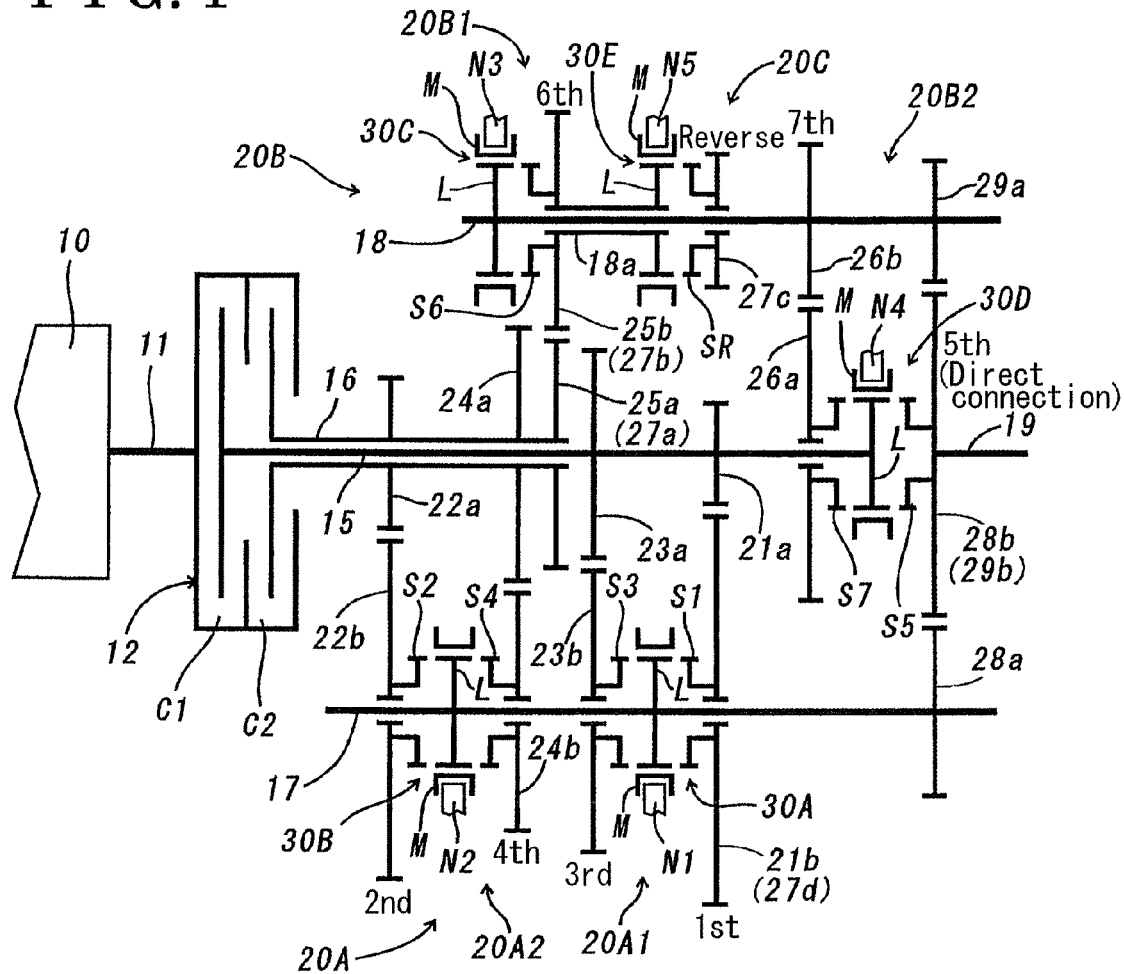
FIG. 1 is a view schematically illustrating an entire structure of a gear-type transmission apparatus according to a first embodiment of the present invention.
Figure 2:
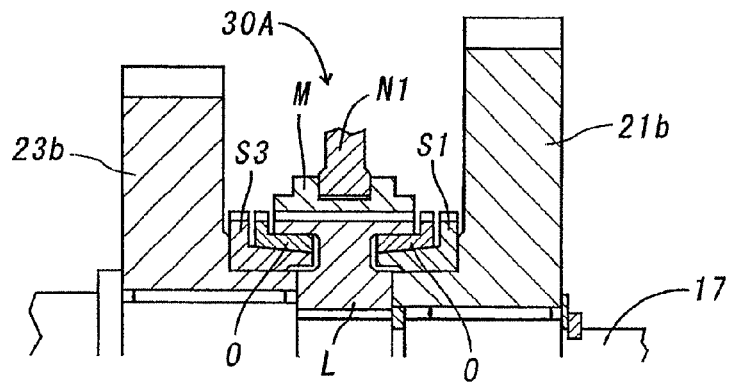
FIG. 2 is a sectional view illustrating an example of a switching clutch applied to the first embodiment illustrated in FIG. 1.

A first embodiment of a gear-type transmission apparatus will be described below in accordance with FIGS. 1, 2 and 3 of the attached drawings. According to the first embodiment, the gear-type transmission is applied to an automatic transmission having seven forward shift stages and one reverse shift stage. As illustrated in FIG. 1, the gear-type transmission apparatus according to the first embodiment includes a first input shaft 15, a second input shaft 16 formed in a hollow shape and provided rotatably so as to surround the first input shaft 15, a first and a second counter shafts 17 and 18 arranged in parallel to the first and the second input shafts 15 and 16, and an output shaft 19. The output shaft 19 is aligned coaxially with the first input shaft 15 that penetrates through the second input shaft 16 formed in the hollow shape and extends backwards so that the output shaft 19 is arranged so as to extend in the direction opposite to the engine 10. The output shaft 19 is connected to driving wheels (not shown). Further, the gear-type transmission apparatus includes a dual clutch mechanism 12 at which a first frictional clutch C1 (a first clutch) and a second frictional clutch C2 (a second clutch) are provided. The first and the second frictional clutches C1 and C2 are rotatably actuated by a power source such as an engine 10 via a driving shaft 11. Further, the first input shaft 15, which is connected to the first frictional clutch C1, is rotatably driven in response to an operation of the first frictional clutch C1. Likewise, the second input shaft 16, which is connected to the second frictional clutch C2, is rotatably driven in response to an operation of the second frictional clutch C2. The first frictional clutch C1 is controlled to establish or interrupt a path for transmitting a torque A, for example, to the odd shift stage gears (1st, 3rd, 5th and 7th), while the second frictional clutch C2 is controlled to establish or interrupt a path for transmitting a torque B, for example, to the even shift stage gears (2nd, 4th, and 6th). When a vehicle is driven in a normal condition the first and the second frictional clutches C1 and C2 of the dual clutch mechanism 12 are controlled by a control device (not shown) in a manner where; 1) during a shift operation, the first and the second frictional clutches C1 and C2 are in a partial clutch engaging state, which results in the torque A being increased and the torque B being decreased, and vice versa, 2) and after the shift operation has ended, the first frictional clutch C1 is completely engaged, which results in the torque A of the first frictional clutch C1 reaching a predetermined maximum value while the second clutch C2 is disengaged and the torque B corresponds to the second frictional clutch C2 dropping to a zero value, and vice versa.

A first gear change mechanism 20A is provided between the first counter shaft 17 and the first and the second input shafts 15 and 16 so as to connect the first counter shaft 17 and each of the first and the second input shaft 15 and 16. A second gear change mechanism 20B is provided between the first and the second input shafts 15, 16 and the second counter shaft 18 so as to connect the second counter shaft 18 and each of the first and the second input shafts 15 and 16. Further, a reverse gear switching unit 20C is arranged between the first counter shaft, the second input shaft 16 and the second counter shaft 18 so as to connect the first counter shaft 17, the second input shaft 16 and the second counter shaft 18. The first input shaft 15 and the output shaft 19, which are coaxially aligned, are connected/disconnected by means of a part of a fourth forward movement switching clutch 30D that will be explained below. The first counter shaft 17 is connected to the output shaft 19 via a first reduction gear set (28a, 28b), and the second counter shaft 18 is connected to the output shaft 19 via a second reduction gear set (29a, 29b). A driven gear is commonly used by the first and the second reduction gear sets, more specifically, a driven gear 28b of the first reduction gear set is also functions as a driven gear 29b of the second reduction gear set. However, for an explanatory purpose, the driven gear is described differently as the driven gear 28*b* and the driven gear 29*b*. The driven gear (28*b*, 29*b*) is fixed at a front end portion (an end portion) of the output shaft 19 facing the first input shaft 15.

The first gear change mechanism 20A includes a first gear switching unit 20A1, which is provided between the first input shaft 15 and the first counter shaft 17 so as to connect the first input shaft 15 and the first counter shaft 17, and a second gear switching unit 20A2, which is provided between the second input shaft 16 and the first counter shaft 17 so as to connect the second input shaft 16 and the first counter shaft 17. The first gear switching unit 20A1 includes a gear set (21*a*, 21*b*) for a 1st shift stage, a gear set (23*a*, 23*b*) for a 3rd shift stage and a first forward movement switching clutch 30A (a forward movement switching clutch). The 1st shift stage gear set includes a driving gear 21*a* fixed at the first input shaft 15 and a driven gear 21*b* (which is commonly used as a reverse driven gear 27*d*) rotatably provided at the first counter shaft 17. The 3rd shift stage gear set includes a driving gear 23*a* fixed at the first input shaft 15 and a driven gear 23*b* rotatably provided at the first counter shaft 17.

A known synchromesh mechanism is adapted to the first forward movement switching clutch 30A. As illustrated in FIGS. 1 and 2, the synchromesh mechanism incorporates therein a clutch hub L spline-engaged with the first counter shaft 17 so that the first forward movement switching clutch 30A is arranged between the 1st shift stage driven gear 21*b* and the 3rd shift stage driven gear 23*b*, a 1st shift stage engaging member S1 press-fitted to the 1st shift stage driven gear 21*b*, a 3rd shift stage engaging member S3 press-fitted to the 3rd shift stage driven gear 23*b*, a synchronizer ring O interposed between the clutch hub L and each of the 1st and 3rd shift stage engaging members S1 and S2, and a sleeve M spline-engaged with an outer periphery of the clutch hub L so as to be movable in an axial direction of the first counter shaft 17. The synchromesh mechanism synchronizes a rotation of either the driven gear 21*b* or 23*b* with the rotation of the first counter shaft 17 in turn, or simultaneously desynchronizes the rotations of both the driven gears 21*b* and 23*b* from the rotation of the first counter shaft 17. When the first forward movement switching clutch 30A is in a neutral position as illustrated in FIG. 1, the sleeve M of the first forward movement switching clutch 30A is engaged neither with the 1st shift stage engaging member S1 nor with the 3rd shift stage engaging member S3. However, once the sleeve M is shifted towards the 1st shift stage driven gear 21*b* by a shift fork N engaged with a peripheral annular-shaped groove of the sleeve M, the sleeve M is firstly spline-engaged with the synchronizer ring O at the side of the 1st shift stage driven gear 21*b*, wherein rotation of the first counter shaft 17 is synchronized with rotation of the 1st shift stage driven gear 21*b*. Then, the sleeve M is spline-engaged with peripheral teeth of the 1st shift stage engaging member S1 in order to integrally rotate the 1st shift stage driven gear 21*b* and the first counter shaft 17. As a result, the 1st shift stage is established. When the 1st shift stage is established, the rotation of the first input shaft 15 is transmitted to the output shaft 19 via the 1st shift stage gear set 21*a*, 21*b* and the first reduction gear set 28, 28*b*. Meanwhile, once the sleeve M is shifted towards the 3rd shift stage driven gear 23*b* by the shift fork N, the rotation of the first counter shaft 17 is synchronized with the rotation of the 3rd shift stage driven gear 23*b*, and then the first counter shaft 17 is integrally rotated with the 3rd shift stage driven gear 23*b*. As a result, the 3rd shift stage is established.

The second gear switching unit 20A2 is structured substantially the same as the first gear switching unit 20A1. The second gear switching unit 20A2 is structured with a gear set (22*a*, 22*b*) for a 2nd shift stage, a gear set (24*a*, 24*b*) for a 4th shift stage and a second forward movement switching clutch 30B. When the second forward movement switching clutch 30B is in a neutral position as illustrated in FIG. 1, a sleeve M of the second forward movement switching clutch 30B is engaged neither with a 2nd shift stage engaging member S2 press-fitted to a 2nd shift stage driven gear 22*b* nor with a 4th shift stage engaging member S4 press-fitted to a 4th shift stage driven gear 24*b*. However, once the sleeve M of the second forward movement switching clutch 30B is shifted towards the 2nd shift stage engaging member S2 by a shift fork N2, the rotation of the first counter shaft 17 is synchronized with a rotation of the 2nd shift stage driven gear 22*b*, and then the 2nd shift stage driven shaft 22*b* is integrally rotated with the first counter shaft 17. As a result, the 2nd shift stage is established. Meanwhile, once the sleeve M of the second forward movement switching clutch 30B is shifted towards the 4th shift stage engaging member S4, the rotation of the first counter shaft 17 is synchronized with a rotation of the 4th shift stage driven gear 24*b*, and then the 4th shift stage driven gear 24*b* is integrally rotated with the first counter shaft 17. As a result, the 4th shift stage is established.

The second gear change mechanism 20B includes a third gear switching unit 20B1, which is provided between the second input shaft 16 and the second counter shaft 18 so as to connect the second input shaft 16 and the second counter shaft 18, and a fourth gear switching unit 20B2, which is provided between the first input shaft 15 and the second counter shaft 18 so as to connect the first input shaft 15 and the second counter shaft 18. The third gear switching unit 20B1 includes a gear set (25*a*, 25*b*) for a 6th shift stage and a third forward movement switching clutch 30C. The 6th shift stage gear set includes a driving gear 25*a* fixed at the second input shaft 16 and a driven gear 25*b* provided at a sleeve 18*a* rotatably provided at the second counter shaft 18. The third forward movement switching clutch 30C is a synchromesh mechanism that synchronizes/desynchronizes a rotation of the 6th shift stage driven gear 25*b* with/from the rotation of the second counter shaft 18. The third forward movement switching clutch 30C is structured substantially the same as the first forward movement switching clutch 30A except that a clutch hub L of the third forward movement switching clutch 30C is spline-engaged with an end portion of the second counter shaft 18 at the side of a 6th shift stage driven gear 25*b*, and that only one engaging member, specifically a 6th shift stage engaging member S6 is press-fitted to the 6th shift stage driven gear 25*b*. When the third forward movement switching clutch 30C is in a neutral position as illustrated in FIG. 1, the third forward movement switching clutch 30C is not engaged with the 6th shift stage engaging member S6. However, once a sleeve M of the third forward movement switching clutch 30C is shifted towards the 6th shift stage engaging member S6 by a shift fork N3, the rotation of the first counter shaft 17 is synchronized with a rotation of the 6th shift stage driven gear 25*b*, and then the first counter shaft 17 is integrally rotated with the 6th shift stage driven gear 25*b*. As a result, the 6th shift stage is established. When the 6th shift stage is established, the rotation of the second counter shaft 16 is transmitted to the output shaft 19 via the 6th shift stage gear set 25*a*, 25*b* and the second reduction gear set 29*a*, 29*b*.

The fourth gear switching unit 20B2 includes a gear set (26*a*, 26*b*) for a 7th shift stage and a fourth forward movement switching clutch 30D (another forward movement switching clutch). The fourth forward movement switching clutch 30D is structured substantially the same as the first forward movement switching clutch 30A. The fourth forward movement switching clutch 30D is provided between the first input shaft 15 and the output shaft 19 that is coaxially aligned with the first input shaft 15. A clutch hub L of the fourth forward movement switching clutch 30D is spline-fixed at the front end portion of the first output shaft 15. The 7th shift stage gear set includes a driving gear 26a rotatably provided at the first input shaft 15 so as to face the fourth forward movement switching clutch 30D and a driven gear 26b fixed at the second counter shaft 18. A 7th shift stage engaging member S7 of the fourth forward movement switching clutch 30D is press-fitted to the 7th shift stage driven gear 26a. A 5th shift stage engaging member S5 of the fourth forward movement switching clutch 30D is press-fitted to the reduction driven gear 28b (29b) that is fixed at the front end portion of the output shaft 19. When the fourth forward movement switching clutch 30D is in a neutral position as illustrated in FIG. 1, a sleeve M of the fourth forward movement switching clutch 30D is engaged neither with the 2nd shift stage engaging member S2 nor the 4th shift stage engaging member S4. However, once the sleeve M of the fourth forward movement switching clutch 30D is shifted towards the 7th shift stage driven gear 26a by a shift fork N4, a rotation of the 7th shift stage driven gear 26a is synchronized with the rotation of the first input shaft 15, and then the 7th shift stage driven gear 26a is integrally rotated with the first input shaft 15. As a result, the 7th shift stage is established. Meanwhile, once the sleeve M of the fourth forward movement switching clutch 30D is shifted towards the reduction driven gear 28b (29b) by the shift fork N4, rotation of the output shaft 19 is synchronized with the rotation of the first input shaft 15, and then the first input shaft 15 and the output shaft 19 are directly connected. As a result, the 5th shift stage is established. When the 5th shift stage is established, the rotation of the first input shaft 15 is transmitted to the output shaft 19 via the 5th shift stage engaging member S5 of the fourth forward movement switching clutch 30D.

The reverse gear switching unit 20C is structured with a reverse gear set, a reverse movement switching clutch 30E (a switching clutch) and a switching clutch that is also serves as a part of the first forward movement switching clutch 30A of the first gear switching unit 20A1. The reverse gear set includes a reverse shift stage driving gear 27a (which is also commonly used as the 6th shift stage driven gear 25a) fixed at the first input shaft 16, a first reverse shift stage intermediate gear 27b (which is also commonly used as the 6th shift stage driven gear 25b) that is fixed at the sleeve 18a rotatably provided at the second counter shaft 18 and is engaged with the reverse shift stage driving gear 27a, a second reverse shift stage intermediate gear 27c rotatably provided at the second counter shaft 18, and a reverse shift stage driven gear 27d that is rotatably provided at the first counter shaft 17 and engages with the second reverse shift stage intermediate gear 27c. The reverse movement switching clutch 30E is provided at the second counter shaft 18 so as to be positioned between the sleeve 18a and the second reverse shift stage intermediate gear 27c. The switching clutch is formed between the reverse shift stage driven gear 27d and the 3rd shift stage driven gear 23b. The reverse movement switching clutch 30E is structured substantially identical to the third forward movement switching clutch 30C. The reverse movement switching clutch 30E forms a synchromesh mechanism that synchronizes/desynchronizes a rotation of the first reverse movement intermediate gear 27b with/from a rotation of the second reverse shift stage intermediate gear 27c by the sleeve 18a. A clutch hub L of the reverse movement switching clutch 30E is spline-engaged with the sleeve 18a so that the clutch hub L and the sleeve 18a are integrally rotated, and a reverse shift stage engaging member SR of the reverse movement switching clutch 30E is press-fitted to the second reverse shift stage intermediate gear 27c so that the reverse shift stage engaging member SR and the reverse shift stage intermediate gear 27c are integrally rotated.

When the reverse movement switching clutch 30E is in a neutral position as illustrated in FIG. 1, the rotation of the second reverse shift stage intermediate gear 27c is not synchronized with the rotation of the first reverse shift stage intermediate gear 27b, and the rotation of the first counter shaft 17 is also not synchronized with rotation of the reverse shift stage driven gear 27d. However, once a sleeve M of the reverse movement switching clutch 30E is shifted towards the reverse shift stage engaging member SR by a shift fork N5, the rotation of the second reverse shift stage intermediate gear 27c is synchronized with the rotation of the first reverse shift stage intermediate gear 27d, and then the first and the second reverse shift stage intermediate gears 27c and 27b are integrally rotated. As a result, the reverse shift stage is established. When the reverse shift stage is established, the rotation of the second input shaft 16 is transmitted to the output shaft 19 via the reverse gear set 27a, 27b, 27c and 27d and the first reduction gear set 28a and 28b.

According to the first embodiment, the number of the teeth of each gear used for each shift stage, the reverse shift stage and reduction gear set is formed so that a gear ratio of each shift stage achieves a predetermined value. When the vehicle is driven in the 1st shift stage (i.e., first speed range), a reduction gear ratio between the first input shaft 15 and the output shaft 19 becomes the largest, compared to a case where other shift stages for forward movement are established. When the vehicle is moved backwardly in the reverse shift stage, the reduction gear ratio between the first input shaft 15 and the output shaft 19 becomes equal to or more than the reduction gear ratio established when the vehicle is driven in the 1st shift stage. Further, when the vehicle is driven backwardly in the reverse shift stage, the output shaft 19 is rotated inversely to a rotational direction of the output shaft 19 being rotated in the 1st shift stage. Additionally, when the vehicle is driven in the 5th shift stage, the gear ratio of the 5th shift stage becomes 1 because the output shaft 19 is directly connected to the first input shaft 15.

The control device of the gear-type transmission apparatus according to the first embodiment operates the first and the second frictional clutches C1 and C2 of the dual clutch mechanism 12, and the control device also operates the first, the second, the third and the fourth forward movement switching clutches 30A, 30B, 30C and 30D as explained in FIG. 3 depending on a condition of the vehicle, for example, depending on an accelerator opening degree, engine rotational speed, speed of the vehicle and the like. When the vehicle is stopped without running the engine 10, the first and the second frictional clutches C1 and C2 of the dual clutch mechanism 12 are both disengaged, therefore, each of the first, the second, the third and the fourth forward movement switching clutches 30A, 30B, 30C and 30D remains in a neutral position. When the engine 10 is started while the vehicle is parked, and then when a gear lever (not shown) connected to the gear-type transmission apparatus is set to be at a forward movement position, the control device establishes the 1st shift stage by engaging the sleeve M of the 1st shift stage forward movement switching clutch 30A with the 1st shift stage engaging member S1 and by controlling each of the other clutches to be at the neutral position as explained in a table for the 1st shift stage in FIG. 1. When the accelerator opening degree increases and the rotational speed of the engine 10 exceeds a predetermined low rotational speed, the control device gradually increases an engagement force applied to the first frictional clutch C1 of the dual clutch mechanism 12 in response to the increase of the accelerator opening degree. Accordingly, a driving torque of the driving shaft 11 is transmitted to the output shaft 19 via the first input shaft 15, the 1st shift stage gear set 21a, 21b, the first forward movement switching clutch 30A, the first counter shaft 17, and the first reduction gear set 28a, 28b. As a result, the vehicle is driven in the 1st shift stage.

When, for example, the accelerator opening degree (i.e., throttle opening degree) is increased and the condition of the vehicle becomes suitable for the vehicle to be driven in the 2nd shift stage, the control device firstly engages the sleeve M of the 2nd shift stage forward movement switching clutch 30B and the 2nd shift stage engaging member S2 in order to establish the 2nd shift stage. Then, the control device switches the dual clutch mechanism 12 to a second frictional clutch C2 engaging stage from a first frictional clutch C1 engaging stage so that the vehicle is driven in the 2nd shift stage. Further, the control device disengages the sleeve M of the first forward movement switching clutch 30A from the 1st shift stage engaging member S1. As a result, a state explained in the table for 2nd shift stage in FIG. 3 is established. Likewise, the control device selects the shift stage appropriate to the condition of the vehicle, for example, the control device establishes the 3rd shift stage or the 4th shift stage depending on the condition of the vehicle, and also the control device selects either the first frictional clutch C1 or the second frictional clutch C2 to be engaged in order to drive the vehicle at a shift stage appropriated to the condition of the vehicle.

When the condition of the vehicle becomes suitable for the vehicle to be driven in the 5th shift stage, the control device engages the sleeve M of the fourth forward movement switching clutch 30D with the 5th shift stage engaging member S5 in order to directly connect the first input shaft 15 and the output shaft 19, and the control device establishes the 5th shift stage. Then, the control device switches the dual clutch mechanism 12 to the first frictional clutch C1 engaging stage from the second frictional clutch C2 engaging stage so that the vehicle is driven in the 5th shift stage. Further, the control device disengages the sleeve M of the second forward movement switching clutch 30B from the 4th shift stage engaging member S4. As a result, as illustrated in FIG. 3, a state explained in the table for 4th shift stage is established. Likewise, when the condition of the vehicle becomes suitable for the vehicle to be driven in the 6th shift stage, the control device engages the sleeve M of the third forward movement switching clutch 30C with the 6th shift stage engaging member S6 in order to establish the 6th shift stage. Then, the control device switches the dual clutch mechanism 12 to the second frictional clutch C2 engaging stage from the first frictional clutch C1 engaging stage, further, the control device disengages the sleeve M of the fourth forward movement switching clutch 30D from the 5th shift stage engaging member S5 in order to establish a state explained in the table for 6th shift stage in FIG. 3. When the vehicle is driven in the 6th shift stage, the driving torque of the driving shaft 11 is transmitted to the output shaft 19 via the second frictional clutch C2, the second input shaft 16, the 6th shift stage gear set 25a, 25b, the third forward movement switching clutch 30C, the second counter shaft 18, and the second reduction gear set 29a, 29b.

When the condition of the vehicle becomes suitable for the vehicle to be driven in the 7th shift stage, the control device engages the sleeve M of the fourth forward movement switching clutch 30D with the 7th shift stage engaging member S7 in order to establish the 7th shift stage. Then, the control device switches the dual clutch mechanism 12 to the first frictional clutch C1 engaging stage from the second frictional clutch C2 engaging stage so that the vehicle is driven in the 5th shift stage. Further, the control device disengages the sleeve M of the third forward movement switching clutch 30C from the 6th shift stage engaging member S6. As a result, as illustrated in FIG. 3, a state explained in the table for 7th shift stage is established. When the vehicle is driven in the 6th shift stage or in the 7th shift stage, the rotational speed of the output shaft 19 becomes faster than the rotational speed of the driving shaft 11. Additionally, when the speed of the vehicle decreases from a certain speed and when the condition of the vehicle becomes suitable for the vehicle to be driven in a low shift stage, the control device selects the low shift stage appropriate to the condition of the vehicle. Then, the control device also selects either the first frictional clutch C1 or the second frictional clutch C2 to be engaged in turn in order to drive the vehicle at a shift stage appropriate to the condition of the vehicle.

As described above, a switching operation of each of the forward movement switching clutches 30A, 30B, 30C and 30D is conducted by the control device under a condition where the control device controls the dual clutch mechanism 12 to be in either the first frictional clutch C1 engaging stage or the second frictional clutch C2 engaging state. In other words, the switching operation of each of the forward movement switching clutches 30A, 30B, 30C and 30D is conducted by the control when either the first frictional clutch C1 or the second frictional clutch C2 is disengaged so that the driving torque is not transmitted to the disengaged forward movement switching clutch. Hence, a shift operation between each shift stage is smoothly conducted.

Once the gear lever connected to the gear-type transmission apparatus is set to a reverse shift operation position under a condition where the vehicle is stopped while the engine 10 is running, the control device detects the aforementioned state of the vehicle, and as explained in the table for a reverse operation in FIG. 3, the control device engages the sleeve M of the reverse movement switching clutch 30E with the reverse shift stage engaging member SR, and also the control device engages the sleeve M of the first forward movement switching clutch 30A with the 1st shift stage engaging member S1 in order to control the reverse movement switching clutch 30E and the first forward movement switching clutch 30A to be in the neutral position. As a result, the reverse shift stage is established. When the accelerator opening degree is increased and when the rotational speed of the engine 10 exceeds the predetermined low rotational speed, the control device gradually increases the engagement force applied to the second frictional clutch C2 of the dual clutch mechanism 12. Accordingly, the driving torque of the driving shaft 11 is transmitted to the output shaft 19 via the second frictional clutch C2, the second input shaft 16, the reverse shift stage driving gear 27a (which is commonly used also as the 6th shift stage driven gear 25a), the first reverse shift stage intermediate gear 27b (which is commonly used as the 6th shift stage driven gear 25b), the sleeve 18a, the reverse shift stage engaging member SR of the reverse movement switching clutch 30E, the second reverse shift stage intermediate gear 27c, the reverse shift stage driven gear 27d (which is commonly used as the 1st shift stage driven gear 21b), the 1st shift stage engaging member S1 of the first forward movement switching clutch 30A, the first counter shaft 17 and the first reduction gear set 28a, 28b. As a result, the vehicle is driven backwardly.

According to the first embodiment, the first gear change mechanism 20A is provided between the first and the second input shafts 15, 16 and the first counter shaft 17 so as to connect the first and the second input shafts 15,16 and the first counter shaft 17, and the second gear change mechanism 20B is provided between the first and the second input shafts 15, 16 and the second counter shaft 18 so as to connect the first and the second input shafts 15, 16 and the second counter shaft 18. The first and the second gear change mechanisms 20A and 20B are arranged so as to be in parallel to each other in the axial direction of the shafts and so as to be overlapped with each other in the axial direction. Hence, an entire length of the gear-type transmission apparatus is shortened, which further results in downsizing the gear-type transmission apparatus. In addition, the first and the second reverse shift stage intermediate gears 27b and 27c of the reverse gear set are provided at the second counter shaft 18. Hence, a reverse shaft for supporting the first and the second reverse shift stage intermediate gears 27b 27c does not need to be provided at the gear-type transmission apparatus in addition to the first and the second input shafts 15 and 16, which are provided coaxially, and the first and the second counter shafts 17 and 18, which are arranged in parallel to the first and the second input shafts 15 and 16. As a result, a cross-sectional area of the gear-type transmission apparatuses being viewed in a direction perpendicular to the axial direction of the shafts is reduced by an area needed for the reverse shaft and the gears supported thereby, compared to the known gear-type transmission apparatuses. Hence, the gear-type transmission apparatus according to the first embodiment is downsized, compared to the known gear-type transmission apparatuses. A torque transmission to the reverse gear set 27a, 27b, 27c and 27d is interrupted by the reverse movement switching clutch 30E having the reverse shift stage engaging member SR while the vehicle is driven forward or while the vehicle is not in motion.

According to the first embodiment, a reverse shift stage intermediate gear includes the first reverse shift stage intermediate gear 27b and the second reverse shift stage intermediate gear 27c. The first reverse shift stage intermediate gear 27b is fixed at the sleeve 18a rotatably provided on the second counter shaft 18 and is engaged with the reverse shift stage driving gear 27a. The second reverse shift stage intermediate gear 27c is rotatably provided at the second counter shaft 18 and is engaged with the reverse shift stage driven gear 27d. The reverse movement switching clutch 30E having the reverse shift stage engaging member SR is arranged between the sleeve 18a and the second reverse shift stage intermediate gear 27c. This allows a reduction gear ratio of the reverse gear set to be readily adjusted by reducing or increasing the number of teeth of each of the first and the second reverse shift stage intermediate gears 27b and 27c. Further, according to the first embodiment, the clutch hub L of the reverse movement switching clutch 30E is fixed at the sleeve 18a, and the reverse shift stage engaging member SR is fixed at the second reverse shift stage intermediate gear 27c. Hence, the reverse movement switching clutch 30E is readily assembled to the gear-type transmission apparatus.

According to the first embodiment, the output shaft 19 is coaxially aligned with the first input shaft 15 so that the output shaft 19 extends in the direction opposite to the engine 10. Further, the first counter shaft 17 is connected to the output shaft 19 via the first reduction gear set 28a and 28b, and the second counter shaft 18 is connected to the output shaft 18 via the second reduction gear set 29a and 29b. Hence, the output shaft 19 extends from the gear-type transmission apparatus in a rearward direction opposite from the engine 10. As a result, the gear-type transmission apparatus according to the first embodiment is suitable for a front-engine rear-drive type vehicle. However, constructions of the gear-type transmission apparatus is not limited to the above-mentioned first embodiment. For example, the output shaft 19 may be arranged so as to be parallel to each of the first and the second input shafts 15, 16 and each of the first and the second counter shafts 17, 18 so that the gear-type transmission apparatus is laterally mounted on the vehicle so as to extend in the vertical direction relative to a vehicle moving direction.

According to the first embodiment, the reverse shift stage driving gear 27a and the first reverse shift stage intermediate gear 27b of the reverse gear set also serves as the 6th shift stage gear set 25a and 25b respectively. Further, the reverse shift stage driven gear 27d of the reverse gear set also serves as the 1st shift stage driven gear 21b. As a result, the number of gears provided at the gear-type transmission apparatus is reduced, which further results in simplifying the structure of the gear-type transmission apparatus. In the first embodiment, the 6th shift stage gear set 25a, 25b and the 1st shift stage driven gear 21b function also as a part of the reverse gear set. However, the present invention is not limited on the first embodiment. For example, a part of other gears for forward movement may be also used as a part of the reverse gear set. Further, the reverse gear set may be provided individually to the gear-type transmission apparatus without using the part of gears for the forward movement.

According to the first embodiment, the output shaft 19 is coaxially aligned with the first input shaft 15. The end portion of the first input shaft 15 is engageably and disengageably connected to the front end portion of the output shaft 19 facing the first input shaft 15 by means of the 5th shift stage engaging member S5 of the fourth forward movement switching clutch 30D. Hence, a gear shift stage, in which the first input shaft 15 is connected to the output shaft 19, is achieved only by adding the 5th shift stage engaging member S5 to the fourth forward movement switching clutch 30D.

Second Embodiment

A second embodiment of the gear-type transmission apparatus according to the present invention will be described below in accordance with FIGS. 4 and 5 of the attached drawings. As is the case with the first embodiment, the present invention is applied to an automatic transmission having seven different forward shift stages and one reverse shift stage. A main difference between the first embodiment and the second embodiment is that the gear-type transmission apparatus according to the second embodiment includes an output shaft 39, and a first and a second counter shaft 37, 38 that are arranged in parallel to the output shaft 39. Further, a first input reduction gear set 50a, 50b (a driven gear 50b is commonly used as a first reverse shift stage intermediate gear 48b described below) is provided between the first counter shaft 37 and the output shaft 39 so as to connect the first counter shaft 37 and the output shaft 39 and so as to be positioned close to a dual clutch mechanism 12. Similarly, a second input reduction gear set 51a, 51b is provided between the second counter shaft 38 and the output shaft 39 so as to connect the second counter shaft 38 and the output shaft 39 and so as to be positioned close to the dual clutch mechanism 12.

Figure 4:
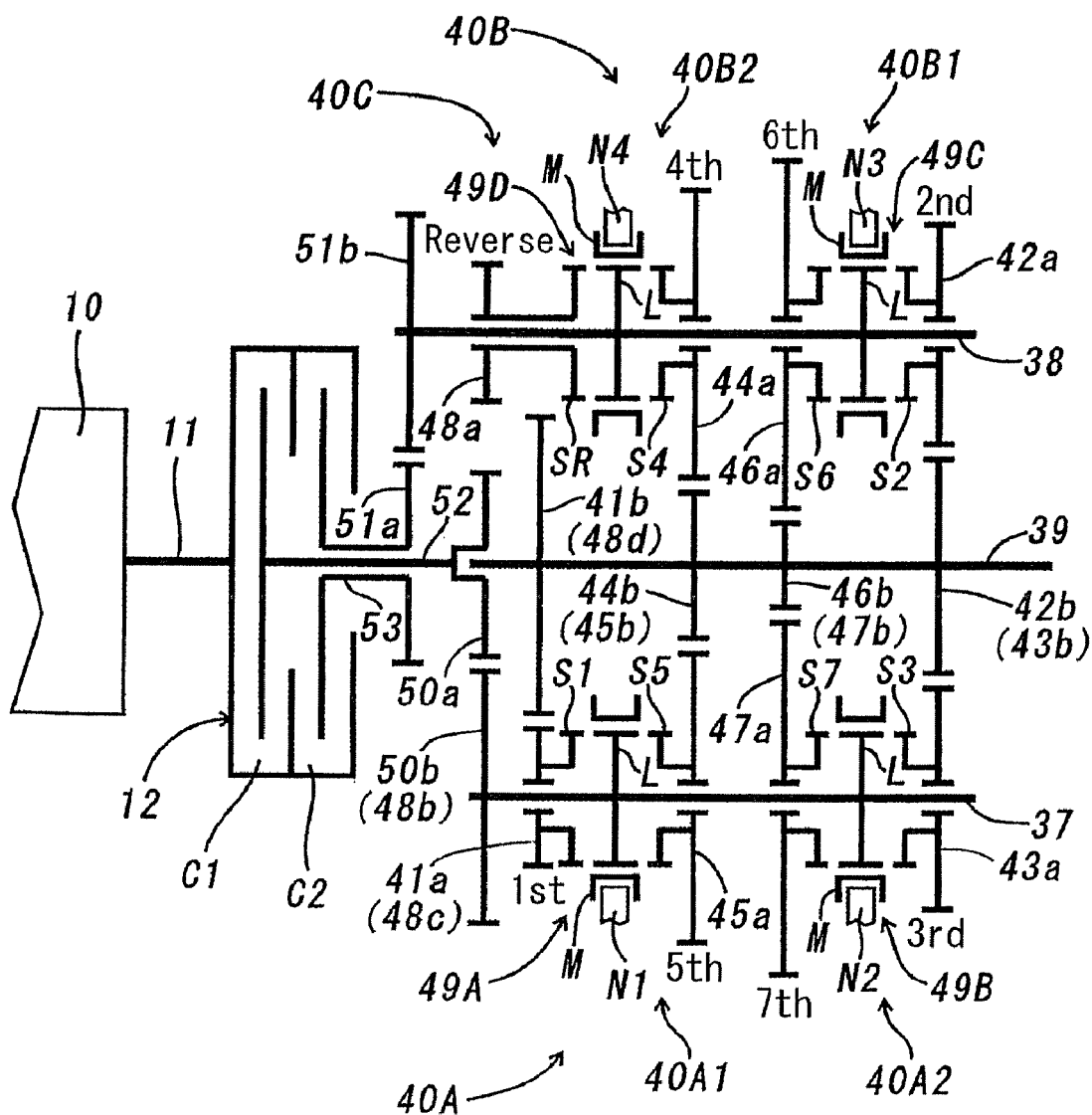
FIG. 4 is a view schematically illustrating an entire structure of the gear-type transmission according to a second embodiment of the present invention.
Figure 6:
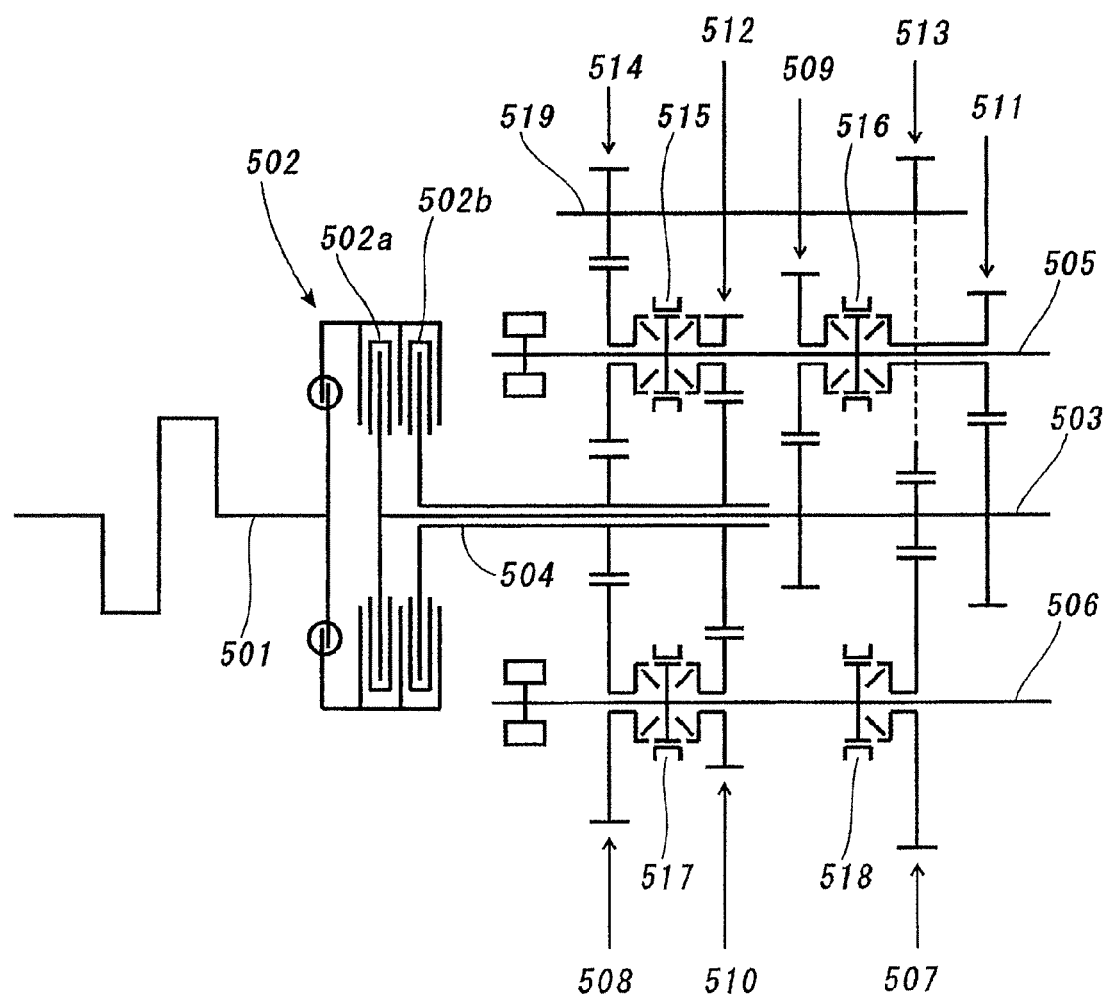
FIG. 6 is a view illustrating an example of a structure of the gear-type transmission apparatus according to the prior art.

As illustrated in FIG. 4, for example, when a first frictional clutch C1 (a first clutch) of the dual clutch mechanism 12, which functions and is structured substantially the same as the dual clutch mechanism 12 of the first embodiment, is in an engaged state, a rotation of an engine 10 is transmitted to the first counter shaft 37 via the first frictional clutch C1 and the first input reduction gear set 50a, 50b. Similarly, when a second frictional clutch C2 (a second clutch) is in the engaged stage, the rotation of the engine 10 is transmitted to the second counter shaft 38 via the second frictional clutch C2 and the second input reduction gear set 51a, 51b. A first gear change mechanism 40A is arranged between the first counter shaft 37 and the output shaft 39 so as to connect the first counter shaft 37 and the output shaft 39, and a second gear change mechanism 40B is arranged between the second counter shaft 38 and the output shaft 39 so as connect the second counter shaft 38 and the output shaft 39. The first gear change mechanism 40A includes a first gear switching unit 40A1 and a second gear switching unit 40A2, both of which are provided between the first counter shaft 37 and the output shaft 39 so as to connect the first counter shaft 37 and the output shaft 39. The second gear change mechanism 40B includes a third gear switching unit 40B1 and a fourth gear switching unit 40B2, both of which are provided between the second counter shaft 38 and the output shaft 39 so as to connect the second counter shaft 38 and the output shaft 39. Further, a reverse gear switching unit 40C is arranged between the first counter shaft 37, the second counter shaft 38 and the output shaft 39 so as to connect the first and the second counter shafts 37, 38 and the output shaft 39.

The first gear switching unit 40A1 includes a gear set for a 1st shift stage (41a, 41b), a gear set for a 5th shift stage (45a, 45b) and a first forward movement switching clutch 49A. The driven gear 41a and the driving gear 41b of the 1st shift stage gear set are commonly used as a second reverse shift stage intermediate gear 48c and a reverse shift stage driven gear 48d respectively. Further, the driven gear 45b of the 5th shift stage gear set is commonly used as a driven gear 44b of a 4th shift stage gear set described below. The first forward movement switching clutch 49A is structured substantially the same as the first forward movement switching clutch 30A of the first embodiment. When the first forward movement switching clutch 49A is in a neutral position as illustrated in FIG. 4, a sleeve M of the first forward movement switching clutch 49A is engaged neither with a 1st shift stage engaging member S1 nor with a 5th shift stage engaging member S5. However, once the sleeve M of the first forward movement switching clutch 49A is shifted towards the 1st shift stage engaging member S1 by a shift fork N1, a rotation of the 1st shift stage driving gear 41a and a rotation of the first counter shaft 37 are synchronized. Then, the 1st shift stage driving gear 41a and the first counter shaft 37 are integrally rotated. As a result, the 1st shift stage is established. Meanwhile, once the sleeve M of the first forward movement switching clutch 49A is shifted towards the 5th shift stage engaging member S5, a rotation of the 5th shift stage driving gear 45a and the rotation of the first counter shaft 37 are synchronized. Then, the 5th shift stage driving gear 45a and the first counter shaft 37 are integrally rotated. As a result, the 5th shift stage is established.

Likewise, the second gear switching unit 40A2 includes a gear set for a 3rd shift stage (43a, 43b), a gear set for a 7th shift stage (47a, 47b) and a second forward movement switching clutch 49B. When the second forward movement switching clutch 49B is in a neutral position as illustrated in FIG. 4, a sleeve M of the second forward movement switching clutch 49B is engaged neither with a 3rd shift stage engaging member S3 nor with a 7th shift stage engaging member S7. However, once the sleeve M of the second forward movement switching clutch 49B is shifted towards the 3rd shift stage engaging member S3 by a shift fork N2, a rotation of the 3rd shift stage driving gear 43a and the rotation of the first counter shaft 37 are synchronized. Then, the 3rd shift stage driving gear 43a and the first counter shaft 37 are integrally rotated. As a result, the 3rd shift stage is established. Meanwhile, once the sleeve M of the second forward movement switching clutch 49B is shifted towards the 7th shift stage engaging member S7, a rotation of the 7th shift stage driving gear 47a and the rotation of the first counter shaft 37 are synchronized. Then, the 7th shift stage driving gear 47a and the first counter shaft 37 are integrally rotated. As a result, the 7th shift stage is established.

As is the case with the first and the second gear switching units 40A1 and 40A2, the third gear switching unit 30B1 includes a gear set for a 2nd shift stage (42a, 42b), a gear set for a 6th shift stage (46a, 46b) and a third forward movement switching clutch 49C. When the third forward movement switching clutch 49C is in a neutral position as illustrated in FIG. 4, a sleeve M of the third forward movement switching clutch 49C is engaged neither with a 2nd shift stage engaging member S2 nor with a 6th shift stage engaging member S6. However, once the sleeve M of the third forward movement switching clutch 49C is shifted towards the 2nd shift stage engaging member S2 by a shift fork N3, a rotation of the 2nd shift stage driving gear 42a and rotation of the second counter shaft 38 are synchronized. Then, the 2nd shift stage driving gear 42a and the second counter shaft 38 are integrally rotated. As a result, the 2nd shift stage is established. Meanwhile, once the sleeve M of the third forward movement switching clutch 49C is shifted towards the 6th shift stage engaging member S6, a rotation of the 6th shift stage driving gear 46a and the rotation of the second counter shaft 38 are synchronized. Then, the 6th shift stage driving gear 46a and the second counter shaft 38 are integrally rotated. As a result, the 6th shift stage is established. Likewise, the fourth gear switching unit 40B2 includes a gear set for a 4th shift stage (44a, 44b) and a part of a fourth switching clutch 49D (a switching clutch). When the fourth switching clutch 49D is in a neutral position as illustrated in FIG. 4, a sleeve M of the fourth switching clutch 49D is not engaged with a 4th shift stage engaging member S4. However, once the sleeve M of the fourth switching clutch 49D is shifted towards the 4th shift stage engaging member S4, a rotation of the 4th shift stage driving gear 44a and the rotation of the second counter shaft 38 are synchronized. Then, the 4th shift stage driving gear 44a and the second counter shaft 38 are integrally rotated. As a result, the 4th shift stage is established.

The reverse gear switching unit 40C includes a reverse gear set, a part of the fourth switching clutch 49D provided on the second counter shaft 38 so as to be positioned between the reverse shift stage driving gear 48a and the 4th shift stage driven gear 44a, and a switching clutch that also functions as a part of the first forward movement switching clutch 49A of the first gear switching unit 40A1. The reverse gear set includes a reverse shift stage driving gear 48a rotatably provided at the second counter shaft 38, a first reverse shift stage intermediate gear 48b fixed at the first counter shaft 37 and engaged with the reverse shift stage driving gear 48a, the second reverse shift stage intermediate gear 48c rotatably provided at the first counter shaft 37, and the reverse shift stage driven gear 48d fixed at the output shaft 39 and engaged with the second reverse shift stage intermediate gear 48c. The first reverse shift stage intermediate gear 48d is also described as the driven gear 50b of the first input reduction gear set 50a, 50b, the second reverse shift stage intermediate gear 48c is also described as the 1st shift stage driving gear 41a, and the reverse shift stage driven gear 48d is also described as the 1st shift stage driven gear 41b. The fourth switching clutch 49D forms a synchromesh mechanism in which a reverse shift stage engaging member SR of the fourth switching clutch 49D is press-fitted to the reverse shift stage driving gear 48a so that the reverse shift stage engaging member SR is integrally rotated with the reverse shift stage driving gear 48a. Further, the part of the fourth switching clutch 49D synchronizes/desynchronizes a rotation of the reverse shift stage driving gear 48a with/from the rotation of the second counter shaft 38.

When the fourth switching clutch is in a neutral position as illustrated in FIG. 4, the rotation of the reverse shift stage driving gear 48a is not synchronized with the rotation of the second counter shaft 38, and a rotation of the second reverse shift stage intermediate gear 48c is also not synchronized with the rotation of the first counter shaft 37. The reverse shift stage is established in a manner where, the sleeve M of the fourth switching clutch 49D is shifted towards the reverse shift stage engaging member SR by the shift fork N4 in order to synchronize the rotation of the reverse shift stage driving gear 48a with the rotation of the second counter shaft 38, which leads the reverse shift stage driving gear 48a and the second counter shaft 38 being integrally rotated, and at the same time, the sleeve M of the first forward movement switching clutch 49A is shifted towards the 1st shift stage engaging member S1 in order to synchronize the rotation of the second reverse shift stage intermediate gear 48c with the rotation of the first counter shaft 37. When the reverse shift stage is established, the rotation of the second counter shaft 38 is transmitted to the output shaft 39 via the reverse gear set 48a, 48b, 48c and 48d.

As is the case with the first embodiment, according to the second embodiment, the number of teeth of each gear is set so that a gear ration of each shift stage achieves a predetermined value.

Further, as is the case with the first embodiment, a control device (not shown) of the gear-type transmission apparatus according to the second embodiment operates the first and the second frictional clutches C1 and C2 of the dual clutch mechanism 12, and the control device also operates the first, the second, the third and the fourth switching clutches 49A, 49B, 49C and 49D as explained in FIG. 3 depending on a condition of the vehicle, for example, depending on an accelerator opening degree, engine rotational speed, speed of the vehicle and the like. As is the case with the first embodiment, when the vehicle is not driven without running the engine 10, the first and the second frictional clutches C1 and C2 of the dual clutch mechanism 12 are both disengaged, therefore, each of the first, the second, the third and the fourth switching clutches 49A, 49B, 49C and 49D remains in the neutral position. When the engine 10 is started while the vehicle is parked, and then when a gear lever (not shown) connected to the gear-type transmission apparatus is set to be at a forward movement position, the control device establishes the 1st shift stage by engaging sleeve M of the first forward movement switching clutch 49A with the 1st shift stage engaging member S1 and by controlling each of the other clutches to be at the neutral position as explained in a table of the 1st shift stage in FIG. 5. When the accelerator opening degree increases and the rotational speed of the engine 10 exceeds a predetermined low rotational speed, the control device gradually increases an engagement force applied to the first frictional clutch C1 of the dual clutch mechanism 12 in response to the increase of the accelerator opening degree. Accordingly, a driving torque of a driving shaft 11 connecting the engine 10 and the dual clutch mechanism 12 is transmitted to the output shaft 39 via the first frictional clutch C1, a first input shaft 52, the first input reduction gear set 50a and 50b, the first counter shaft 37, the first forward movement switching clutch 49A, and the 1st shift stage gear set 41a and 41b. As a result, the vehicle is driven in the 1st shift stage.

When the condition of the vehicle becomes suitable for the vehicle to be driven in the 2nd shift stage, the control device firstly engages the sleeve M of the third forward movement switching clutch 49C with the 2nd shift stage engaging member S2 in order to establish the 2nd shift stage. Then, the control device switch the dual clutch mechanism 12 to a second frictional clutch C2 engaging state from a first frictional clutch C1 engaging state so that the vehicle is driven in the 2nd shift stage. Further, the control device disengages the sleeve M of the first forward movement switching clutch 49A from the 1st shift stage engaging member S1. As a result, a state explained in a table for the 2nd shift stage in FIG. 5 is established. When the state explained in the table for the 2nd shift stage in FIG. 5 is established, the driving torque of the driving shaft 11 is transmitted to the output shaft 39 via the second frictional clutch C2, a second input shaft 53, the second input reduction gear set 51a and 51b, the second counter shaft 38, the third forward movement switching clutch 49C, and the 2nd shift stage gear set 42a and 42b.

Likewise, when the condition of the vehicle becomes suitable for the vehicle to be driven either in the 3rd shift stage, the 4th shift stage, the 5th shift stage, the 6th shift stage or the 7th shift stage, the control device selects a shift stage appropriate to the condition of the vehicle. Then, the control device engages the sleeve M of a corresponding forward movement switching clutch 49A, 49B, 49C or 49D with a corresponding engaging member S3, S4, S5, S6 or S7. At the same time, the control device selects either the first frictional clutch C1 or the second frictional clutch C2 to be engaged in order to drive the vehicle in a shift stage appropriate to the condition of the vehicle.

As is the case with the first embodiment, a switching operation of each of the forward movement switching clutches 49A, 49B, 49C and 49D is conducted by the control device under a condition where the control device controls the dual clutch mechanism 12 to be in either the first frictional clutch C1 engaging state of the second frictional clutch C2 engaging state. In other words, the switching operation of each of the forward movement switching clutches 49A, 49B, 49C and 49D is conducted by the control device when either the first frictional clutch C1 or the second frictional clutch C2 is disengaged so that the driving torque is not transmitted to the disengaged forward movement switching clutches. Hence, a shift operation between each shift stage is smoothly conducted.

Once the gear lever connected to the gear-type transmission apparatus is set to a reverse shift operation position under a condition where the vehicle is temporarily stopped while the engine 10 is running, the control device detects the aforementioned state of the vehicle, and as explained in a table for the reverse shift stage in FIG. 5, the control device engages the sleeve M of the fourth switching clutch 49D with the reverse shift stage engaging member SR, and also, the control device engages the sleeve M of the first forward movement switching clutch 49A with the 1st shift stage engaging member S1. Further the control device controls the other switching clutches to be in the neutral positions. As a result the reverse shift stage is established. When the accelerator opening degree is increased and the rotational speed of the engine 10 exceeds a predetermined low rotational speed, the control device gradually increases the engagement force applied to the second frictional clutch C2 of the dual clutch mechanism 12. Accordingly, the driving torque of the driving shaft 11 is transmitted to the output shaft 39 via the second frictional clutch C2, the second input reduction gear set 51a and 51b, the second counter shaft 38, the reverse shift stage engaging member SR of the fourth switching clutch 49D, the reverse shift stage driving gear 48a, the first reverse shift stage intermediate gear 48b (which is commonly used as the driven gear 50b of the first input reduction gear set), the first counter shaft 37, the 1st shift stage engaging member S1 of the first forward movement switching clutch 49A, the second reverse shift stage intermediate gear 48c (which is commonly used as the 1st shift stage driving gear 41a), and the reverse shift stage driven gear 48d (which is commonly used as the 1st shift stage driven gear 41b). As a result, the vehicle starts moving backwardly.

According to the second embodiment, as is the case with the first embodiment, the first gear change mechanism 40A is provided between the first counter shaft 37 and the output shaft 39 so as to connect the first counter shaft 37 and the output shaft 39. The second gear change mechanism 40B is provided between the second counter shaft 38 and the output shaft 39 so as to connect the second counter shaft 38 and the output shaft 39. The first and the second gear change mechanisms 20A and 20B are arranged so as to be in parallel to each other in the axial direction of the shafts and so as to be overlapped with each other in the axial direction. Hence, an entire length of the gear-type transmission apparatus according to the second embodiment is shortened, which further results in downsizing of the gear-type transmission apparatus. In addition, the first and the second reverse shift stage intermediate gears 48b and 48c of the reverse gear set (48a, 48b, 48c and 48d) are provided at the first counter shaft 37. Hence, a reverse shaft for supporting the first and the second reverse shift stage intermediate gears 48b and 48c does not need to be provided at the gear-type transmission apparatus in addition to the output shaft 39, the first and the second counter shafts 37 and 38 which are arranged in parallel to the output shaft 39. As a result, a cross-sectional area of the gear-type transmission apparatus viewed in a direction perpendicular to an axial direction of the shafts is reduced by an area needed for the reverse shaft and the gears supported thereby, compared to the known gear-type transmission apparatuses. Hence, the gear-type transmission apparatus according to the second embodiment is downsized, compared to the know hear-type transmission apparatuses. A torque transmission to the reverse gear set is interrupted by the fourth switching clutch 49D having the reverse shift stage engaging member SR while the vehicle is driven forward or while the vehicle is not in motion.

According to the second embodiment, a reverse shift stage intermediate gear includes the first reverse shift stage intermediate gear 48b and the second reverse shift stage intermediate gear 48c. The first reverse shift stage intermediate gear 48b is fixed on the first counter shaft 37 and is engaged with the reverse shift stage driving gear 48a. The second reverse shift stage intermediate gear 48c is rotatably provided at the first counter shaft 37 and is engaged with the reverse shift stage driven gear 48d. The fourth switching clutch 49D having the reverse shift stage engaging member SR is provided at the second counter shaft 38 so as to be positioned between the 4th shift stage driving gear 44a and the reverse shift stage driving gear 48a. This allows a reduction gear ratio of the reverse gear set to be readily adjusted by reducing or increasing a number of teeth of each of the first and the second reverse shift stage intermediate gears 48b and 48c. Further, according to the second embodiment, the clutch hub L of the fourth switching clutch 49D is fixed at the second counter shaft 38, and the reverse shift stage engaging member SR is fixed at the reverse shift stage driving gear 48a. Hence, the fourth switching clutch 49D having the reverse shift stage engaging member SR is readily assembled to the gear-type transmission apparatus.

According to the second embodiment, parts of the gears for forward movement shift stages are utilized as parts of the reverse gear set, specifically, the first reverse shift stage intermediate gear 48d of the reverse gear set also functions as the driven gear 50b of the first input reduction gear set, and the second reverse shift stage intermediate gear 48c and the reverse shift stage driven gear 48d also function as the 1st shift stage gear set 41a and 41b respectively. As a result, the number of gears used at the gear-type transmission apparatus is reduced, which further results in simplifying the structure of the gear-type transmission apparatus. In the second embodiment, the driven gear 50B of the first input reduction gear set and the 1st shift stage gear set 41a and 41b serve as the parts of the reverse gear set. However, the present invention is not limited to the above-mentioned structure. For example, a part of other gears for forward movement shift stages may also be utilized as a part of the reverse gear set. Further, the reverse gear set may be provided individually to the gear-type transmission apparatus without using the part of gears for the forward movement shift stages.

According to the first embodiment, the first gear change mechanism 20A is provided between the first and the second input shaft 15, 16 and the first counter shaft 17 so as to connect the first and the second input shafts 15, 16 and the first counter shaft 17. The second gear change mechanism 20B is provided between the first and the second input shafts 15, 16 and the second counter shaft 18 so as to connect the first and the second input shafts 15, 16 and the second counter shaft 18. The first and the second gear change mechanisms 20A and 20B are arranged so as to be parallel to each other in the axial direction and so as to be overlapped with each other in the axial direction. Hence, the entire length of the gear-type transmission apparatus is shortened, which further results in downsizing of the gear-type transmission apparatus. In addition, the reverse shift stage intermediate gear is provided either on the first counter shaft 17 or the second counter shaft 18. Hence, the reverse shaft for supporting the reverse shift stage intermediate gear does not need to be provided at the gear-type transmission apparatus in addition to the first and the second input shafts 15 and 16, which are arranged coaxially, and the first and the second counter shafts 17 and 18, which are arranged in parallel to the first and the second input shafts 15 and 16. As a result, the cross-sectional area of the gear-type transmission apparatus being viewed in the direction perpendicular to the axial direction of the shafts is reduced by the area needed for the reverse shaft and the gears supported thereby. Hence, the gear-type transmission apparatus according to the first embodiment is downsized, compared to the known gear-type transmission apparatuses. The torque transmission to the output shaft 19 via the reverse gear set is interrupted by the reverse movement switching clutch 30E having the reverse shift stage engaging member SR while the vehicle is driven forward or while the vehicle is not in motion.

According to the first embodiment, the reverse shift stage intermediate gear includes a first reverse shift stage intermediate gear 27b and a second reverse shift stage intermediate gear 27c, both of which are rotatably provided at one of the first and the second counter shafts 17 and 18, the reverse shift stage driving gear 27a is engaged with the first reverse shift stage intermediate gear 27b, the reverse shift stage driven gear 27d is engaged with the second reverse shift stage intermediate gear 27c, and the switching clutch 30E having the reverse shift stage engaging member SR is arranged between the first and the second reverse shift stage intermediate gears 27b and 27c.

Accordingly, the reverse shift stage intermediate gear includes the first and the second reverse shift stage intermediate gears 27b and 27c, both of which are rotatably provided either on the first counter shaft 17 or on the second counter shaft 18. The reverse shift stage driving gear 27a is engaged with the first reverse shift stage intermediate gear 27b, and the reverse shift stage driven gear 27d is engaged with the second reverse shift stage intermediate gear 27c. The reverse movement switching clutch 30E having the reverse shift stage engaging member SR is provided between the first and the second reverse shift stage intermediate gears 27b and 27c. Accordingly, the reduction gear ratio of the reverse gear set is readily adjusted by reducing or increasing the number of the teeth of each of the first and the second reverse shift stage intermediate gears 27b and 27c. Further, the reverse movement switching clutch 30E having the reverse shift stage engaging member SR is readily assembled to the gear-type transmission apparatus.

According to the first embodiment, the reverse shift stage driving gear 27a and the first reverse shift stage intermediate gear 27b are structured by a shift stage gear set forming a part of one of the first and the second gear change mechanisms 20A, 20B, the reverse shift stage driven gear 27d is commonly used with a gear forming a gear set of the other one of the first and the second gear change mechanisms 20A, 20B and is rotatably provided at the other one of the first and the second counter shafts 17, 18, and the gear is shifted to be in an engaged state or in a disengaged state by a forward movement switching clutch.

Accordingly, the reverse shift stage driving gear 27a and the first reverse shift stage intermediate gear 27b are commonly used with a shift stage gear set of either one of the first gear change mechanism 20A or the second gear change mechanism 20B. A gear, which forms the other one of the first gear change mechanism 20A or the second gear change mechanism 20B, rotatably provided either on the first counter shaft 17 or the second counter shaft 18, to which the other one of the first gear change mechanism 20A or the second gear change mechanism 20B is provided, functions as the reverse shift stage driven gear 27d. Further, the rotation of the first reverse shift stage intermediate gear 27b is synchronized/ desynchronized with/from the rotation of the either the first counter shaft 17 or the second counter shaft 18, to which the first reverse shift stage intermediate gear 27b is provided by the first forward movement switching clutch 30A. Accordingly, a part of shift stage gears for the forward movement is utilized as a part of the reverse shift set. Hence, the number of the gear used at the gear-type transmission apparatus is reduced, which further results in simplifying the structure of the gear-type transmission apparatus.

According to the first embodiment, the gear-type transmission apparatus further includes the output shaft 19 arranged coaxially or parallel to the first and the second input shafts 15, 16 so as to extend opposite to the engine 10, a first reduction gear set (28a, 28b) connecting the first counter shaft 17 and the output shaft 19, and a second reduction gear set (29a, 29b) connecting the second counter shaft 18 and the output shaft 19.

Accordingly, the gear-type transmission apparatus further includes the output shaft 19 provided coaxially with or in parallel to the first and the second input shafts 15 and 16 so as to extend opposite to the engine 10, the first reduction gear set (28a, 28b) connecting the first counter shaft 17 and the output shaft 19, and the second reduction gear set (29a, 29b) connecting the second counter shaft 18 and the output shaft 19. Accordingly, as the output shaft 19 extends from the gear-type transmission apparatus in the rearward direction opposite to the engine 10, the gear-type transmission apparatus is suitable for the front-engine rear-drive type vehicle.

According to the first embodiment, the second input shaft 15 is formed in the hollow shape and surrounds the first input shaft 16, the output shaft 19 is coaxially aligned with the first input shaft 15, the end portion of the first input shaft 15 extending from an end portion of the second input shaft 16 in a direction opposite to the engine 10 and the front end portion of the output shaft 19 facing the end portion of the first input shaft 15 are connected/disconnected by another forward movement switching clutch 30D.

Accordingly, the second input shaft 19 is formed in the hollow shape and surrounds the first input shaft 15. Further, the output shaft 19 is coaxially aligned with the first input shaft 15. The end portion of the first input shaft 15 extending from an end portion of the second input shaft 16 opposite to the engine 10 is connected/disconnected to/from the front end portion of the output shaft 19 facing the end portion of the first input shaft 15 by the fourth forward movement switching clutch 30D. Accordingly, the gear shift stage, in which the first input shaft 15 is connected to the output shaft 19, is achieved only by adding the fourth forward movement switching clutch 30D.

According to the second embodiment, the first gear change mechanism 40A is provided between the first counter shaft 37 and the output shaft 39 so as to connect the first counter shaft 37 and the output shaft 39. The second gear change mechanism 40B is provided between the second counter shaft 38 and the output shaft 39 so as to connect the second counter shaft 38 and the output shaft 39. The first and the second gear change mechanisms 40A and 40B are arranged so as to parallel to each other in the axial direction of the shafts and so as to be overlapped with each other in the axial direction. Hence, the entire length of the gear-type transmission apparatus is shortened, which further results in downsizing of the gear-type transmission apparatus. Further, the reverse shift stage intermediate gear of the reverse gear set is provided at one of the first counter shaft 37 or the second counter shaft 38. Hence, the reverse shaft for supporting the reverse shift stage intermediate gear does not need to be provided at the gear-type transmission apparatus in addition to the output shaft 39 and the first and the second counter shafts 37 and 38, which are arranged parallel to the output shaft 39. As a result, the cross-sectional area of the gear-type transmission apparatus being viewed from the direction perpendicular to the axial direction of the shafts is reduced by an area needed for the reverse shaft and the gears supported thereby. Hence, the gear-type transmission apparatus is downsized, compared to the known gear-type transmission apparatuses. The torque transmission to the output shaft 39 via the reverse gear set is interrupted by the fourth switching clutch 49D having the reverse shift stage engaging member SR while the vehicle is driven forward or while the vehicle is not in motion.

According to the second embodiment, the reverse shift stage intermediate gear (48b, 48c) includes the first reverse shift stage intermediate gear 48b and the second reverse shift stage intermediate gear 48c provided at the other one of the first and the second counter shafts 37 and 38, the reverse shift stage driving gear 48a is engaged with the first reverse shift stage intermediate gear 48b, the reverse shift stage driven gear 48d is engaged with the second reverse shift stage intermediate gear 48c, and the switching clutch having the reverse shift stage engaging member SR is provided between the one of the first and the second counter shafts 37 and 38 and the reverse shift stage driving gear (48a).

Accordingly, the reverse shift stage intermediate gear includes the first reverse shift stage intermediate gear 48b and the second reverse shift stage intermediate gear 48c, both of which are provided at the other one of the first and the second counter shafts 37 and 38. The reverse shift stage driving gear 48a is engaged with the first reverse shift stage intermediate gear 48b, and the reverse shift stage driven gear 48d is engaged with the second reverse shift stage intermediate gear 48c. The fourth switching clutch 49D having the reverse shift stage engaging member SR is provided on the one of the first counter shaft 37 and the second counter shaft 38. Accordingly, the reduction gear ratio of the reverse shift set is readily adjusted by modifying the number of the teeth of each of the first and the second reverse shift stage intermediate gears 48b and 48c. Hence, the fourth switching clutch 49D having the reverse shift stage engaging member SR is readily assembled to the gear-type transmission apparatus.

According to the second embodiment, the rotation of the engine 10 is transmitted to the first counter shaft 37 via the first frictional clutch C1 and the first input reduction gear set (50a. 50b), and the rotation of the engine 10 is transmitted to the second counter shaft 38 via the second frictional clutch C2 and the second input reduction gear set (51a, 51b), the first reverse shift stage intermediate gear 48b is commonly used with a driven gear of one of the first and the second input reduction gear sets (50a and 50b, 51a and 51b), the driven gear is fixed at the other one end of the first and the second counter shafts 37 and 38, and the reverse shift stage intermediate gear 48c and the reverse shift stage driven gear 48d are commonly used with a shift stage gear set forming a part of one of the first and the second gear change mechanisms 40A and 40B provided at the other one of the first and the second counter shafts 37 and 38.

Accordingly, the rotation of the engine 10 is transmitted to the first counter shaft 37 via the first frictional clutch C1 and the first input reduction gear set 50a and 50b. The rotation of the engine 10 is transmitted to the second counter shaft 38 via the second frictional clutch C2 and the second input reduction gear set 51a and 51b. A driven gear of one of the first and the second input reduction gear sets 50a and 50b, or 51a and 51b fixed at the other one of the first and the second counter shafts 37 and 38 also serves as the first reverse shift stage intermediate gear 48b. A shift stage gear set forming one of the first and the second gear change mechanism 40A and 40B also serve as the second reverse shift stage intermediate gear 48c and the reverse shift stage driven gear 48d. The first gear change mechanism 40A is arranged between the first counter shaft 37 and the output shaft 39 so as to connect the first counter shaft 37 and the output shaft 39. The second gear change mechanism 40B is arranged between the second counter shaft 38 and the output shaft 39 so as to connect the second counter shaft 38 and the output shaft 39. Accordingly, a part of one of the first and the second input reduction gear sets and a part of the shift gear of the one of the first and the second gear change mechanisms 40A and 40B are utilized as a part of the reverse gear set. As a result, the number of the gears used at the gear-type transmission apparatus is reduced, which further results in simplifying the structure of the gear-type transmission apparatus.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A gear-type transmission apparatus, comprising:
a first input shaft;
a second input shaft provided at the first input shaft so as to be coaxial with the first input shaft and rotatable relative to the first input shaft;
a first counter shaft and a second counter shaft, both of which being arranged in parallel to the first and the second input shafts;
an output shaft;
a dual clutch mechanism having a first clutch and a second clutch for transmitting a rotation of a driving shaft driven by a power source to the first and the second input shafts;
a first gear change mechanism arranged to selectively engage at least one of the first and the second input shafts with the first counter shaft;
a second gear change mechanism arranged to selectively engage at least the other of the first and the second input shafts with the second counter shaft;
a reverse gear set having a reverse shift stage driving gear provided at one of the first and the second input shafts, a reverse shift stage intermediate gear provided at one of the first and the second counter shafts and operably engaged with the reverse shift stage driving gear, and a reverse shift stage driven gear provided at the other one of the first and the second counter shafts and operably engaged with the reverse shift stage intermediate gear; and
a switching clutch having a reverse shift stage engaging member for establishing/interrupting a torque transmission from the driving shaft to the output shaft via the reverse shift gear set.

2. The gear-type transmission apparatus according to claim 1 wherein, the reverse shift stage intermediate gear includes a first reverse shift stage intermediate gear and a second reverse shift stage intermediate gear, both of which are rotatably provided at one of the first and the second counter shafts, the reverse shift stage driving gear is engaged with the first reverse shift stage intermediate gear, the reverse shift stage driven gear is engaged with the second reverse shift stage intermediate gear, and the switching clutch having the reverse shift stage engaging member is arranged between the first and the second reverse shift stage intermediate gears.

3. The gear-type transmission apparatus according to claim 2, wherein the reverse shift stage driving gear and the first reverse shift stage intermediate gear are structured by a shift stage gear set forming a part of one of the first and the second gear change mechanisms, the reverse shift stage driven gear is commonly used with a gear forming a gear set of the other one of the first and the second gear change mechanisms and is rotatably provided at the other one of the first and the second counter shafts, and the gear is shifted to be in an engaged state or in a disengaged state by a forward movement switching clutch.

4. The gear-type transmission apparatus according to claim 3 further including the output shaft arranged coaxially or parallel to the first and the second input shafts so as to extend opposite to the power source, a first reduction gear set connecting the first counter shaft and the output shaft, and a second reduction gear set connecting the second counter shaft and the output shaft.

5. The gear-type transmission apparatus according to claim 4, wherein the second input shaft is formed in a hollow shape and surrounds the first input shaft, the output shaft is coaxially aligned with the first input shaft, an end portion of the first input shaft extending from an end portion of the second input shaft in a direction opposite to the power source and an end portion of the output shaft facing the end portion of the first input shaft are connected/disconnected by another forward movement switching clutch.

6. The gear-type transmission apparatus according to claim 5, wherein a rotation of the power source is transmitted to the first counter shaft via the first clutch and a first input reduction gear set, the rotation of the power source is transmitted to the second counter shaft via the second clutch and a second input reduction gear set, the first reverse shift stage intermediate gear is commonly used with a driven gear of one of the first and the second input reduction gear sets, the driven gear is fixed at the other one end of the first and the second counter shafts, and the reverse shift stage intermediate gear and the reverse shift stage driven gear are commonly used with a shift stage gear set forming a part of one of the first and the second gear change mechanisms provided at the other one of the first and the second counter shafts.

7. The gear-type transmission apparatus according to claim 2 further including the output shaft arranged coaxially or parallel to the first and the second input shafts so as to extend opposite to the power source, a first reduction gear set connecting the first counter shaft and the output shaft, and a second reduction gear set connecting the second counter shaft and the output shaft.

8. The gear-type transmission apparatus according to claim 7, wherein the second input shaft is formed in a hollow shape and surrounds the first input shaft, the output shaft is coaxially aligned with the first input shaft, an end portion of the first input shaft extending from an end portion of the second input shaft in a direction opposite to the power source and an end portion of the output shaft facing the end portion of the first input shaft are connected/disconnected by another forward movement switching clutch.

9. The gear-type transmission apparatus according to claim 8, wherein the reverse shift stage intermediate gear includes a first reverse shift stage intermediate gear and a second reverse shift stage intermediate gear provided at the other one of the first and the second counter shafts, the reverse shift stage driving gear is engaged with the first reverse shift stage intermediate gear, the reverse shift stage driven gear is engaged with the second reverse shift stage intermediate gear, and the switching clutch having the reverse shift stage engaging member is provided on the one of the first and the second counter shafts and the reverse shift stage driving gear.

10. The gear-type transmission apparatus according to claim 1 further including the output shaft arranged coaxially or parallel to the first and the second input shafts so as to extend opposite to the power source, a first reduction gear set connecting the first counter shaft and the output shaft, and a second reduction gear set connecting the second counter shaft and the output shaft.

11. The gear-type transmission apparatus according to claim 10, wherein the second input shaft is formed in a hollow shape and surrounds the first input shaft, the output shaft is coaxially aligned with the first input shaft, an end portion of the first input shaft extending from an end portion of the second input shaft in a direction opposite to the power source and an end portion of the output shaft facing the end portion of the first input shaft are connected/disconnected by another forward movement switching clutch.

12. A gear-type transmission apparatus comprising:
an output shaft;
a first counter shaft and a second counter shaft, both of which are arranged parallel to the output shaft;
a dual clutch mechanism having a first clutch and a second clutch for transmitting a rotation of a driving shaft driven by a power source to the first and the second counter shafts;
a first gear change mechanism provided between the first counter shaft and the output shaft;
a second gear change mechanism provided between the second counter shaft and the output shaft;
a reverse gear set having a reverse shift stage driving gear provided at one of the first and the second counter shafts, a reverse shift stage intermediate gear provided at the other one of the first and the second counter shafts and operably engaged with the reverse shift stage driving gear, and a reverse shift stage driven gear provided at the output shaft and operably engaged with the reverse shift stage intermediate gear; and
a switching clutch having a reverse shift stage engaging member for establishing/interrupting a torque transmission from the driving shaft to the output shaft via the reverse shift set,
wherein the reverse shift stage intermediate gear includes a first reverse shift stage intermediate gear and a second reverse shift stage intermediate gear, both of which are rotatably provided at one of the first and the second counter shafts, the reverse shift stage driving gear is engaged with the first reverse shift stage intermediate gear, and the reverse shift stage driven gear is engaged with the second reverse shift stage intermediate gear.

* * * * *